United States Patent Office 2,898,239
Patented Aug. 4, 1959

2,898,239
PROCESS FOR DYEING FIBROUS MATERIALS WITH AQUEOUS CATION ACTIVE LATICES CONTAINING PIGMENT

Georg Sulzer and Peter Guertler, Basel, Willy Fatzer, Bottmingen, and Arthur Maeder, Basel, Switzerland No Drawing. Application November 13, 1956
Serial No. 621,514

Claims priority, application Switzerland
November 30, 1955

8 Claims. (Cl. 117—161)

This invention relates to a process for dyeing with pigments and preparations suitable therefor.

This invention provides a process in which valuable pigment dyeings are obtained when aqueous dyebaths are used which contain pigments dispersed with cation-active dispersing agents and as binding agent a cation-active latex of a polymerizable plastic or an aqueous dispersion, produced with a cation-active dispersing agent, of a derivative, insoluble in water but soluble in organic solvents, of a formaldehyde condensation product of an amino compound yielding with formaldehyde hardenable resins and, when a hardenable compound is present, hardening at elevated temperature after drying. The dyeings obtainable according to the invention are distinguished as a rule by good fastness to migration and satisfactory to good fastness to washing. In the present process it is very advantageous to use water-soluble formaldehyde condensation products of an amino compound yielding with formaldehyde hardenable resins or water-soluble derivatives thereof, whereby the fastness properties of the dyeings can be further increased.

For the preparation of cation-active polymer latices such polymers can be used as contain no. groups which render the same cation-active but which are dispersed with cation-active dispersing agents. Preferably such are used as contain cation-active groups. The polymers can be homo- or co-polymers. They are preferably derived from monomeric compounds with the atom grouping

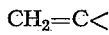

for example from vinyl esters of organic acids such as vinyl acetate, vinyl formate, vinyl butyrate or vinyl benzoate or also from vinyl alkyl ketones, vinyl halides, such as vinyl chloride or vinyl fluoride, vinylidene chloride or vinyl aryl compounds such as styrene and substituted styrenes, or also from compounds of the acrylic acid and methacrylic acid series, such as esters from acrylic acid and alcohols or phenols, for example ethyl acrylate, butyl acrylate or dodecyl acrylate. Further monomeric compounds that can serve for the synthesis of the polymers are acrylonitrile, acrylamide and derivatives substituted on the amide nitrogen, also analogous derivatives of methacrylic acid, α-chloracrylic acid, crotonic acid, maleic acid or fumaric acid, finally polymerizable olefines such as isobutylene, butadiene, 2-chloro-butadiene or heterocyclic compounds, such as the various vinyl pyridines. The manufacture of binary, ternary or more complicatedly constructed copolymers in emulsion form is known so that it is not necessary to describe it further. The following are a few suitable copolymers:

(*a*) Copolymer from 66 parts of n-butyl acrylate, 12 parts of styrene and 22 parts of vinyl isobutyl ether, (*b*) Copolymer from 70 parts of asym. dichlorethene and 30 parts of butyl acrylate.

(*c*) Copolymer from 50 parts of asym. dichlorethene, 45 parts of butyl acrylate and 5 parts of acrylamide, (*d*) Copolymer from 52 parts of vinyl chloride, 35 parts of butyl acrylate, 7 parts of methyl acrylate and 6 parts of acrylamide.

For the cation-active dispersion of such polymers there can be used, for example, compounds of higher fatty amines with acetic acid, hydrochloric or sulfuric acid, such as octadecylamine acetate, (dodecyl)-diethyl-cyclohexylamine sulfate and also salts of diethylaminoethyl esters of higher fatty acids or salts of the type of olelyamidoethyl-diethyl-amino-acetate

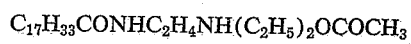

Quaternary ammonium compounds, such as cetyldimethylbenzylammonium chloride, cetyl-trimethyl-ammonium bromide, p-(trimethylammonium)-benzoic acid cetyl ester methosulfate, cetylpyridinium methosulfate, octadecyltrimethylammonium bromide or the quaternary compound from diethyl sulfate and triethanolamine tristearate are also suitable.

The manufacture of latices of polymers with cation-active groups is known per se; such products are described for example in U.S. patent applications Ser. No. 464,599, filed October 25, 1954, by A. Maeder; Ser. No. 464,608, filed October 25, 1954, by A. Maeder; Ser. No. 464,600, filed October 25, 1954, by A. Maeder et al.; and Ser. No. 556,017, filed December 28, 1955, by A. Maeder et al.

The above mentioned derivatives of formaldehyde condensation products of an amino compound yielding hardenable resins with formaldehyde, which derivatives are insoluble in water but soluble in organic solvents, are likewise used in the form of dispersions. These derivatives can be derived on one hand from formaldehyde condensation products of urea, thiourea, guanidine, acetylene-di-urea, dicyandiamide or uron, or also from amino-triazines such as melamine or from guanamines such as acetoguanamine, benzoquanamine or formoguanamine, and on the other hand from alcohols immiscible with water, such as butyl alcohol, amyl alcohol, hexyl alcohol, cyclohexanol, benzyl alcohol, lauryl alcohol, oleyl alcohol or abiethyl alcohol. In addition to the ether residues, the condensation products can also contain residues of high-molecular acids, for example, stearic acid. When such high molecular acid residues are present, the compounds can also be derived from methylol ethers with low-molecular water soluble alcohols. The manufacture of such condensation products is known. The manufacture of the aqueous dispersions can likewise take place with the use of the cation-active dispersing agents mentioned above.

The water-soluble formaldehyde condensation products which are optionally also used are derived from the above mentioned amino compounds. Instead of the free methylol compounds there are also concerned their water soluble ethers with low molecular alcohols such as methanol or ethanol.

As pigments there can be used in the process of the present invention the customary inorganic pigments such as carbon black, titanium oxide, iron oxide or organic pigments, such as vat dyestuff or azo dyestuff pigments, in so far as they can be dispersed with a cation-active dispersing agent. As cation-active dispersing agents for the pigments, the above mentioned products are concerned.

In the application of hardenable compounds, there are advantageously added to the dye-baths hardening catalysts, for example ammonium salts of strong acids. The hardening which is optionally carried out takes place under the customary conditions, for example at 120–160° C. for 2–10 minutes. The use of polymer latices is not always equivalent to that of hardenable resins. The binding agent will be selected according as to whether special effects are also desired, for example as regards softness or crease-resistance.

Dyeing according to the present invention can take place under the customary dyeing conditions, for example by the exhaust process but preferably by the foulard process.

The fiber materials to be treated according to the invention are primarily fabrics of natural or regenerated cellulose, such as cotton, linen, artificial silk or staple fiber, or also cellulose esters, such as acetate silk, wool or synthetic fiber materials such as nylon, polyester fibers or polyacrylonitrile fibers.

The following examples illustrate the invention, the parts being by weight unless otherwise stated and the relation between parts by weight and parts by volume being the same as that between the kilogram and the liter:

*Example 1*

Cotton poplin is dyed on the foulard in a dye-bath containing per liter:

10 grams of a 15% dyestuff paste of copper phthalocyanine which is dispersed with [β-(octadecenoylamido)-ethyl]-diethylmethylammonium-methosulfate, 5 grams of a 70% emulsion of a methylolmelamine-allyl-ether modified with soya fatty acid, emulsification having been carried out with 10% of [β-(octadecenoylamido)-ethyl]-diethylmethylammonium-methosulfate and 4 grams of ammonium nitrate.

Dyeing is carried out on the foulard up to 80% uptake of liquid, drying is effected on a frame and hardening carried out for 5 minutes at 150° C.

A level blue dyeing is obtained of good migration fastness and satisfactory fastness to washing.

*Example 2*

(a) The process is conducted as described in Example 1 but there are used: 40 grams per liter of a copolymer latex with 40% dry content, from 10 parts of the quaternary compound from acrylic acid - (3-diethylaminopropyl)-amide and chloracetamide, 150 parts of isobutyl acrylate and 40 parts of acrylonitrile with [γ-lauroyl-amido) - propyl] - diethylmethyl - ammonium - methosulfate as emulsifier.

(b) The process is conducted as described in Example 1 but there are used: 10 grams per liter of a copolymer latex with 40% dry content, from 90 parts of vinyl acetate and 10 parts of the quaternary compound from acrylic acid-(3-diethylaminopropyl)-amide and chloracetamide with [γ - (lauroylamido) - propyl]-trimethylammonium-methosulfate as emulsifier.

(c) The process is conducted as described in Example 1 but there are used: 40 grams per liter of a copolymer latex with 40% dry content, from 50 parts of vinyl acetate, 40 parts of n-butyl acrylate and 10 parts of the quaternary compound from acrylic acid-(3-diethylaminopropyl)-amide and chloracetamide with [γ-(stearoylamido) - propyl] - dimethyl - (β-hydroxyethyl) - ammonium phosphate as emulsifier.

(d) The process is conducted as described in Example 1 but there are used: 40 grams per liter of the latex mentioned under (a) and 40 grams per liter of a water-soluble methyl ether of a urea-formaldehyde condensation product constaining more than 2 mols formaldehyde condensed per mol of urea.

(e) The process is conducted as described in Example 1 but there are used: 10 grams per liter of the latex mentioned under (b) and 40 grams per liter of a water-soluble methyl ether of a urea-formaldehyde condensation product containing more than 2 mols formaldehyde consensed per mol of urea.

(f) The process is conducted as described in Example 1 but there are used: 10 grams per liter of the latex mentioned under (c) and 40 grams per liter of a water-solube methyl ether of a urea-formaldehyde condensation product containing more than 2 mols formaldehyde condensed per mol of urea.

What is claimed is:

1. A process for dyeing fibrous material with pigments, which comprises contacting the material with an aqueous composition of matter which contains a pigment dispersed with a cation-active dispersing agent and, as a pigment binder, only one member selected from the group consisting of (a) a cation-active latex of a flexible elastic polymerization plastic which has been obtained by polymerization of ethylenically unsaturated compounds and which plastic is the sole water-insoluble constituent in said latex, and of (b) an aqueous dispersion, produced with a cation-active dispersing agent, of a water-insoluble derivative which is soluble in organic solvents of a condensation product of formaldehyde with an aminotriazine; drying the material and heating to harden the composition applied, when a hardenable compound is used; the amount of binder used being about 3.5 to about 16 parts by weight per 1000 parts of the aqueous composition, said parts by weight being calculated on the dry content of the binder.

2. A process for dyeing fibrous material with pigments, which comprises contacting the material with an aqueous composition of matter which contains a pigment dispersed with a cation-active dispersing agent and, as pigment binders (I), only one member selected from the group consisting of (a) a cation-active latex of a flexible elastic polymerization plastic which has been obtained by polymerization of ethylenically unsaturated compounds and which plastic is the sole water-insoluble constituent in said latex, and of (b) an aqueous dispersion, produced with a cation-active dispersing agent, of a water-insoluble derivative which is soluble in organic solvents of a condensation product of formaldehyde with an aminotriazine and (II) a member selected from the group consisting of water-soluble condensation products of formaldehyde with an aminotriazine, water-soluble condensation products of formaldehyde with a urea and water-soluble ethers of such urea and aminotriazine condensation products; drying the material and heating to harden the composition applied; the amount of binders used being about 4 to about 16 parts by weight of binder (I) and about 40 parts by weight of binder (II) per 1000 parts of the aqueous composition, said parts by weight being calculated on the dry content of the binder.

3. A process for dyeing fibrous materials with pigments, which comprises contacting the material with an aqueous composition of matter which contains a pigment dispersed with a cation-active dispersing agent and, as a pigment binder a cation-active latex of a flexible elastic polymerization plastic which itself contains no cation-active groups but is dispersed with a cation-active dispersing agent and has been obtained by polymerization of ethylenically unsaturated compounds and which plastic is the sole water-insoluble constituent in said latex, and drying the material; the amount of binder used being about 4 to about 16 parts by weight per 1000 parts of the aqueous composition, said parts by weight being calculated on the dry content of the binder.

4. A process for dyeing fibrous materials with pigments, which comprises contacting the material with an aqueous composition of matter which contains a pigment dispersed with a cation-active dispersing agent and as a pigment binder a cation-active latex of a flexible elastic polymerization plastic wherein the polymer itself contains cation-active groups and has been obtained by polymerization of ethylenically unsaturated compounds and which plastic is the sole water-insoluble constituent in said latex, and drying the material; the amount of binder used being about 3.5 to 16 parts by weight per 1000 parts of the aqueous composition, said parts by weight being calculated on the dry content of the binder.

5. A process for dyeing fibrous materials with pigments, which comprises contacting the material with an aqueous composition of matter which contains a pigment dispersed with a cation-active dispersing agent and as a pigment binder a latex of a copolymerization product from 10 parts of the quaternary compound from acrylic acid-(3-diethylamino-propyl)-amide and chloracetamide, 150 parts of isobutyl acrylate and 40 parts of acrylonitrile with [γ-(lauroylamido-)propyl]-diethyl-methyl-ammonium-methosulfate as emulsifier; and drying the material, the amount of the binder used being about 16 parts by weight per 1000 parts of the aqueous composition, said parts by weight being calculated on the dry content of the binder.

6. A process for dyeing fibrous materials with pigments, which comprises contacting the material with an aqueous composition of matter which contains a pigment dispersed with a cation-active dispersing agent and as pigment binders (I) a latex of a copolymerization product from 90 parts of vinyl acetate and 10 parts of the quaternary compound from acrylic acid-(3-diethylaminopropyl)-amide and chloracetamide with [γ-(lauroyl-amido)-propyl trimethylammonium methosulfate as emulsifier and (II) a water soluble methyl ether of a urea-formaldehyde condensation product containing more than 2 mols formaldehyde condensed per mol of urea; drying the material and heating to harden the composition applied, the amount of the binders used being about 4 parts by weight of binder (I) and about 40 parts by weight of binder (II) per 1000 parts of the aqueous composition, said parts by weight being calculated on the dry content of the binders.

7. A process for dyeing fibrous materials with pigments, which comprises contacting the material with an aqueous composition of matter which contains a pigment dispersed with a cation-active dispersing agent and as a pigment binder an aqueous dispersion, produced with a cation-active dispersing agent, of a water-insoluble ether of a methylol melamine which is soluble in organic solvents; drying the material and heating to harden the composition applied, the amount of the binder used being about 3.5 parts by weight per 1000 parts of the aqueous composition, said parts by weight being calculated on the dry content of the binder.

8. A process for dyeing fibrous materials with pigments, which comprises contacting the material with an aqueous composition of matter which contains a pigment dispersed with a cation-active dispersing agent and as a pigment binder an aqueous dispersion, produced with [β - (octadecenoyl - amido) - ethyl] - diethyl - methyl-ammonium-methosulfate, of a methylol-melamine-allyl-ether modified with soya fatty acid; drying the material and heating to harden the composition applied, the amount of the binder used being about 3.5 parts by weight per 1000 parts of the aqueous composition, said parts by weight being calculated on the dry content of the binder.

References Cited in the file of this patent
UNITED STATES PATENTS
2,614,086     Jones                   Oct. 14, 1952

UNITED STATES PATENT OFFICE
Certificate of Correction

Patent No. 2,898,239                                      August 4, 1959

Georg Sulzer et al.

It is hereby certified that error appears in the above numbered patent requiring correction and that the said Letters Patent should read as corrected below.

In the grant, lines 1 to 3, for "Georg Sulzer and Peter Guertler, of Basel, Willy Fatzer, of Bottmingen, and Arthur Maeder, of Basel, Switzerland," read —Georg Sulzer and Peter Guertler, of Basel, Willy Fatzer, of Bottmingen, and Arthur Maeder, of Basel, Switzerland, assignors to Ciba Limited, of Basel, Switzerland, a Swiss firm,—; lines 12 and 13, for "Georg Sulzer, Peter Guertler, Willy Fatzer, and Arthur Maeder, their heirs" read —Ciba Limited, their heirs,—; in the heading to the printed specification, lines 5 and 6, for "Georg Sulzer and Peter Guertler, Basel, Willy Fatzer, Bottmingen, and Arthur Maeder, Basel, Switzerland" read —Georg Sulzer and Peter Guertler, Basel, Willy Fatzer, Bottmingen, and Arthur Maeder, Basel, Switzerland, assignors to Ciba Limited, Basel, Switzerland, a Swiss firm—; in the printed specification, column 3, line 62, for "constaining" read —containing—; line 69, for "consensed" read —condensed—.

Signed and sealed this 24th day of May 1960.

[SEAL]

Attest:
KARL H. AXLINE,
*Attesting Officer.*

ROBERT C. WATSON,
*Commissioner of Patents.*